(12) United States Patent
Botti et al.

(10) Patent No.: US 11,912,421 B2
(45) Date of Patent: Feb. 27, 2024

(54) MACHINE COMPRISING A HYBRID POWERTRAIN AND CORRESPONDING CONTROL METHOD

(71) Applicant: VOLTAERO, Médis (FR)

(72) Inventors: Jean Botti, Fort Lauderdale, FL (US); Didier Esteyne, Saujon (FR)

(73) Assignee: VOLTAERO, Médis (FR)

( * ) Notice: Subject to any disclaimer, the term of this patent is extended or adjusted under 35 U.S.C. 154(b) by 150 days.

(21) Appl. No.: 17/614,458

(22) PCT Filed: May 27, 2020

(86) PCT No.: PCT/FR2020/050892
§ 371 (c)(1),
(2) Date: Nov. 26, 2021

(87) PCT Pub. No.: WO2020/240134
PCT Pub. Date: Dec. 3, 2020

(65) Prior Publication Data
US 2022/0234744 A1 Jul. 28, 2022

(30) Foreign Application Priority Data
May 29, 2019 (FR) ...................................... 1905703

(51) Int. Cl.
*B64D 27/02* (2006.01)
*B60L 50/60* (2019.01)
(Continued)

(52) U.S. Cl.
CPC .............. *B64D 27/02* (2013.01); *B60L 50/60* (2019.02); *B64C 27/12* (2013.01); *B64D 27/24* (2013.01);
(Continued)

(58) Field of Classification Search
CPC .. B64D 27/02; B64D 2027/026; B64D 27/24; B64D 31/00; B64D 35/08; B60L 50/60;
(Continued)

(56) References Cited

U.S. PATENT DOCUMENTS 2,462,825 A    2/1949  Zimmerman et al.
3,735,945 A *  5/1973  Huvers ................... B64C 27/12
                                              244/17.19
(Continued)

FOREIGN PATENT DOCUMENTS

CH          703260 A1    12/2011
CN       108082499 A      5/2018
(Continued)

OTHER PUBLICATIONS

French Search Report and Written Opinion dated Dec. 6, 2019 in priority application No. FR1905703; with English machine translation (total 25 pages) (Note: US20160083104, D1, US20140203739, D2, U.S. Pat. No. 2,462,825, D6, and "Coaxial rotors—Wikipedia", D10 cited in the priority French Search Report are not listed in this IDS since they were already listed in the IDS filed Nov. 26, 2021).
(Continued)

*Primary Examiner* — Loren C Edwards
(74) *Attorney, Agent, or Firm* — Seckel IP, PLLC

(57) ABSTRACT

The machine, such as an aircraft, is provided with a powertrain which comprises a vaned propulsion system (3), and a thermal drive system (1), including a first thermal engine (1A) and a second thermal engine (1B), which is configured to allow the vaned propulsion system (3) to be driven. The powertrain also includes an electric drive system (2) which allows the vaned propulsion system (3) to be driven, an electrical power supply system (4) including a battery (40) which allows the electric drive system (2) to be supplied with power. A clutch system (10) allows any or each of the
(Continued)

thermal engines (1A, 1B) to be engaged in order to drive the vaned propulsion system (3), the clutch system (10) also being configured to allow any or each of the thermal engines (1A, 1B) to be disengaged from the vaned propulsion system (3).

20 Claims, 7 Drawing Sheets

(51) Int. Cl.
| | |
|---|---|
| *B64D 27/24* | (2006.01) |
| *B64D 31/00* | (2006.01) |
| *B64C 27/12* | (2006.01) |
| *B64D 35/08* | (2006.01) |
| *B64U 50/11* | (2023.01) |
| *B64U 50/19* | (2023.01) |

(52) U.S. Cl.
CPC ............. *B64D 31/00* (2013.01); *B64D 35/08* (2013.01); *B64U 50/11* (2023.01); *B64U 50/19* (2023.01); *B60L 2200/10* (2013.01); *B64D 2027/026* (2013.01); *Y02T 50/60* (2013.01)

(58) Field of Classification Search
CPC ..... B60L 2200/10; B64C 27/12; B64U 50/11; B64U 50/19; Y02T 50/60
See application file for complete search history.

(56) References Cited

U.S. PATENT DOCUMENTS

| | | | | |
|---|---|---|---|---|
| 5,931,757 | A * | 8/1999 | Schmidt | B60K 6/365 |
| | | | | 903/910 |
| 6,042,499 | A * | 3/2000 | Goi | B64C 27/12 |
| | | | | 475/214 |
| 8,870,114 | B2 | 10/2014 | Botti et al. | |
| 9,914,536 | B2 | 3/2018 | Rossotto | |
| 2009/0145998 | A1 | 6/2009 | Salyer | |
| 2012/0025032 | A1 | 2/2012 | Hopdjanian et al. | |
| 2012/0068007 | A1 * | 3/2012 | Vialle | B64C 27/28 |
| | | | | 244/17.19 |
| 2013/0092789 | A1 | 4/2013 | Botti et al. | |
| 2013/0147204 | A1 | 6/2013 | Botti et al. | |
| 2014/0010652 | A1 * | 1/2014 | Suntharalingam | B64D 27/02 |
| | | | | 475/5 |
| 2014/0203739 | A1 | 7/2014 | Chantriaux et al. | |
| 2014/0283519 | A1 | 9/2014 | Mariotto et al. | |
| 2015/0251770 | A1 | 9/2015 | Bisson et al. | |
| 2016/0083104 | A1 | 3/2016 | Simonetti et al. | |
| 2016/0375994 | A1 | 12/2016 | Rossotto | |

FOREIGN PATENT DOCUMENTS

| | | | | |
|---|---|---|---|---|
| CN | 108082500 A | | 5/2018 | |
| DE | 4239639 A1 | | 5/1994 | |
| DE | 102010021026 A1 | | 11/2011 | |
| FR | 3039614 A1 * | | 2/2017 | ............. B64C 27/12 |
| FR | 3039614 A1 | | 2/2017 | |
| WO | WO-2017149196 A1 * | | 9/2017 | ............. B64C 35/00 |

OTHER PUBLICATIONS

International Search Report and Written Opinion dated Sep. 28, 2020 in counterpart application No. PCT/FR2020/050892; with English partial translation and partial machine translation (total 33 pages).

Anonymous, "Coaxial rotors—Wikipedia", en.wikipedia.org, Jun. 3, 2017, https://en.wikipedia.org/w/index.php?title=Coaxial_rotors@oldid=783681140 [retrieved Nov. 28, 2019] (in English; D6 cited in the ISR).

Chinese Office Action and Search Report dated Oct. 17, 2023 in counterpart application No. CN 202080038866.5; with English machine translation (total 15 pages) (Note: D1 cited in the Chinese Office Action and D2-D5 cited in the Chinese Search Report are not listed in this IDS since they are already of record in this application).

\* cited by examiner

[Fig. 1]
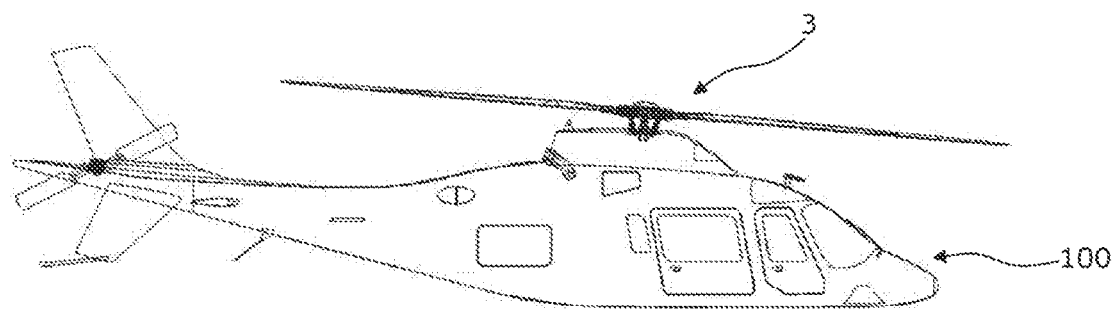

[Fig. 2]
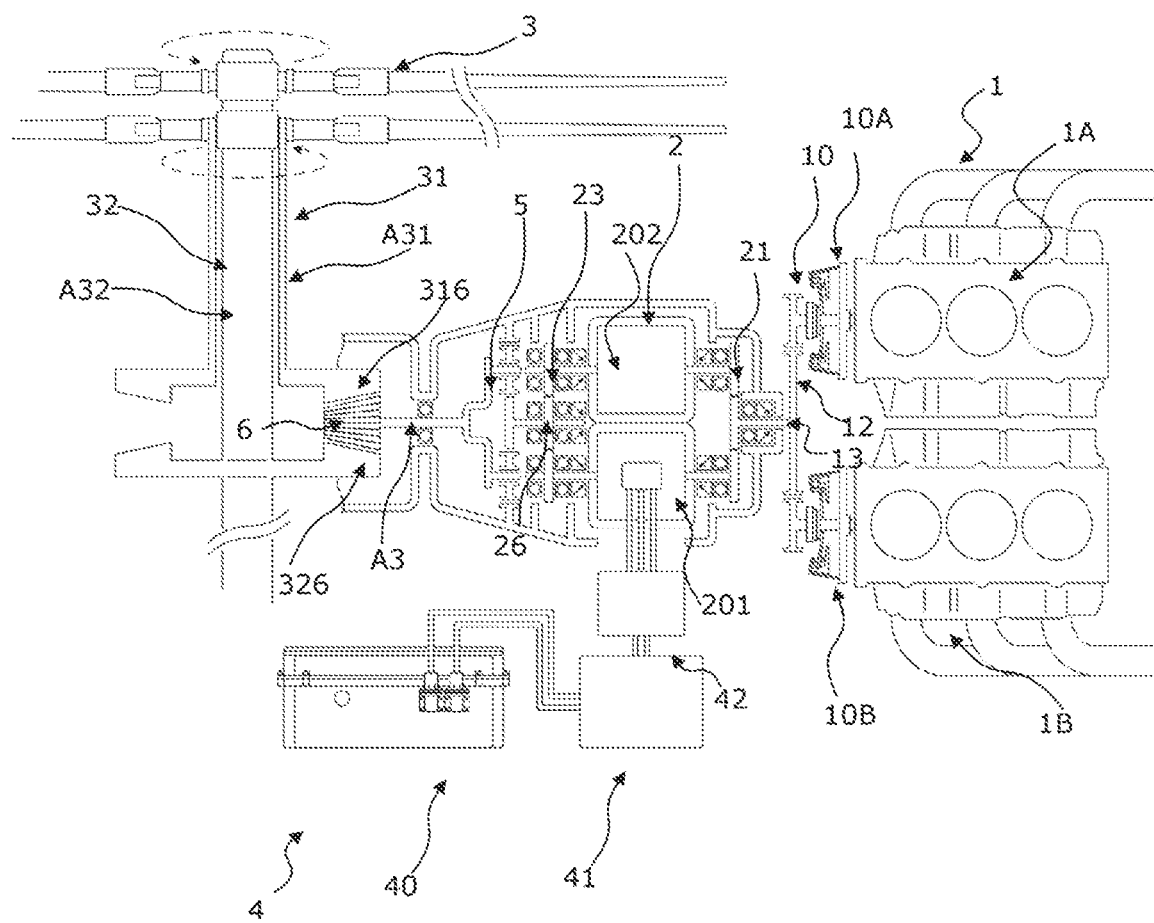

[Fig. 3]
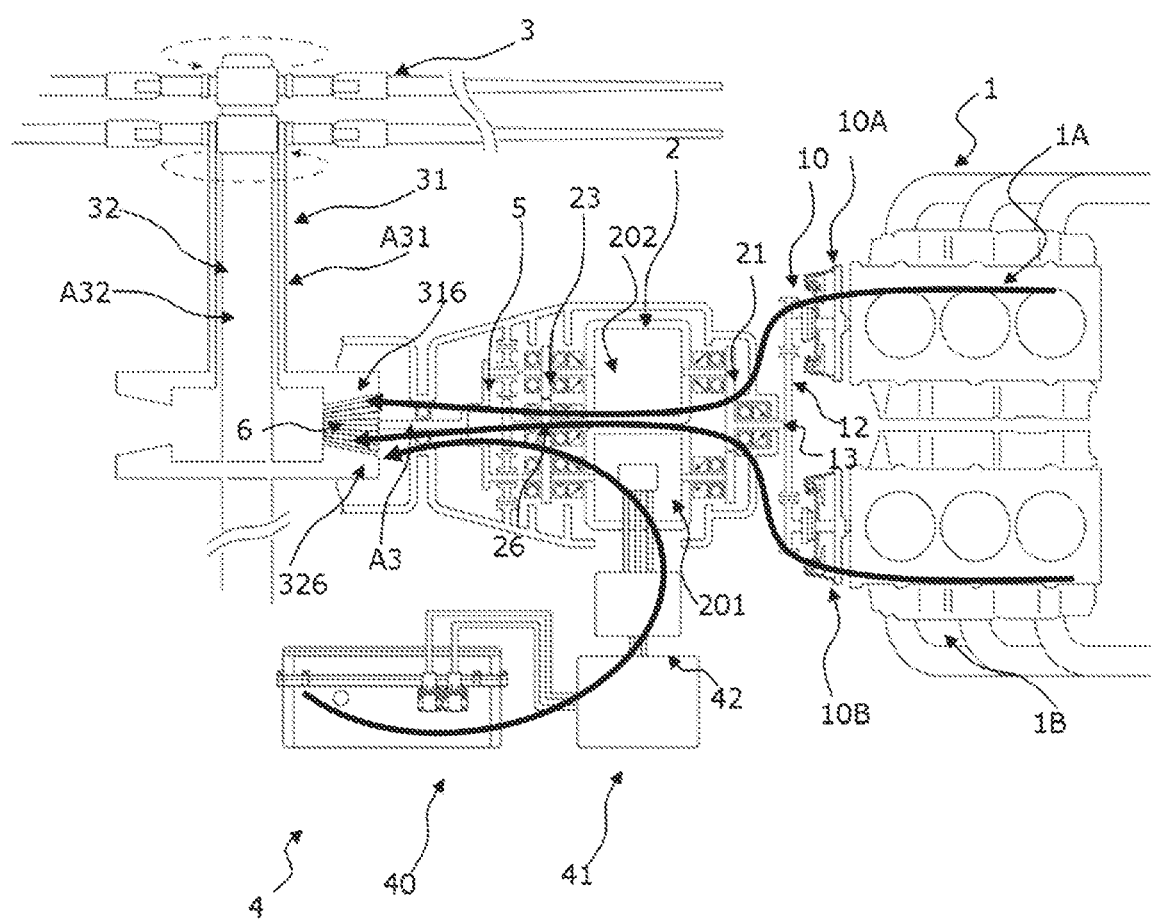

[Fig. 4]
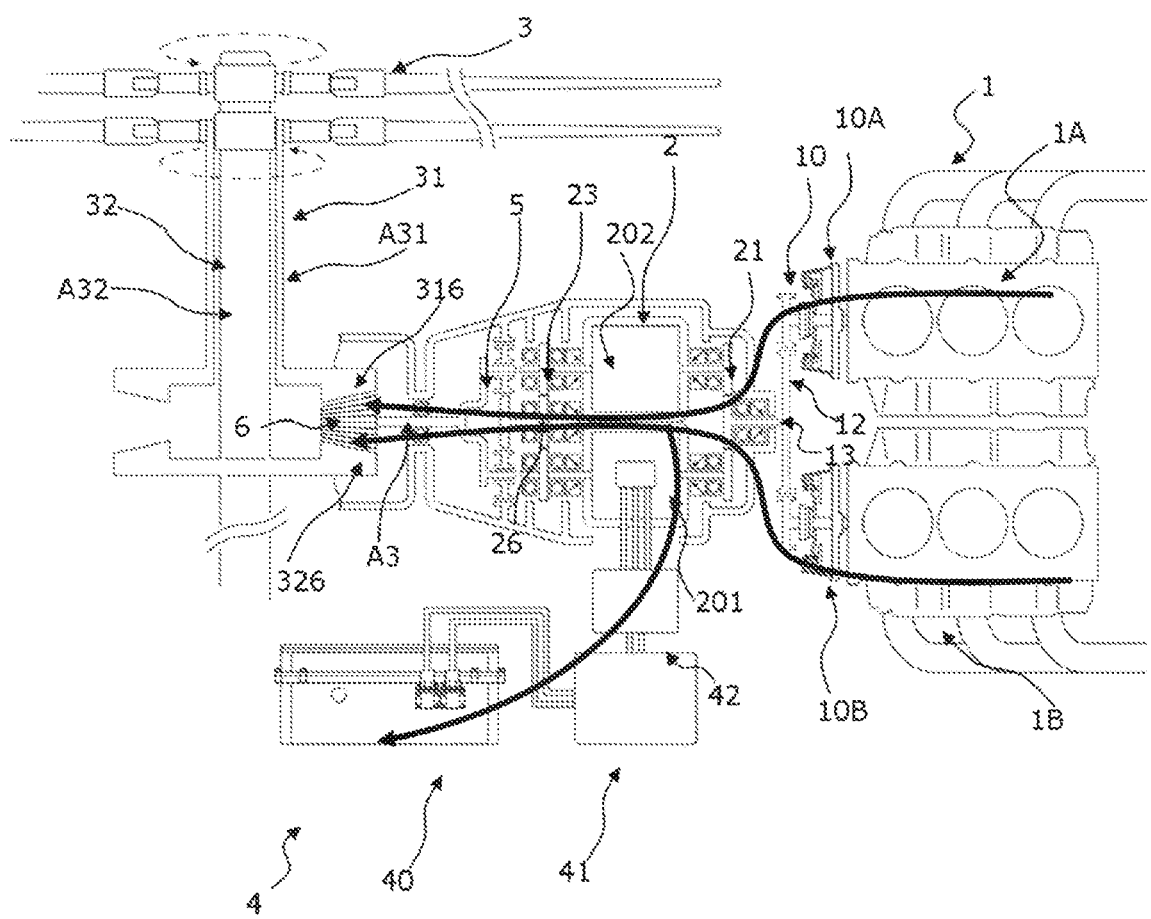

[Fig. 5]
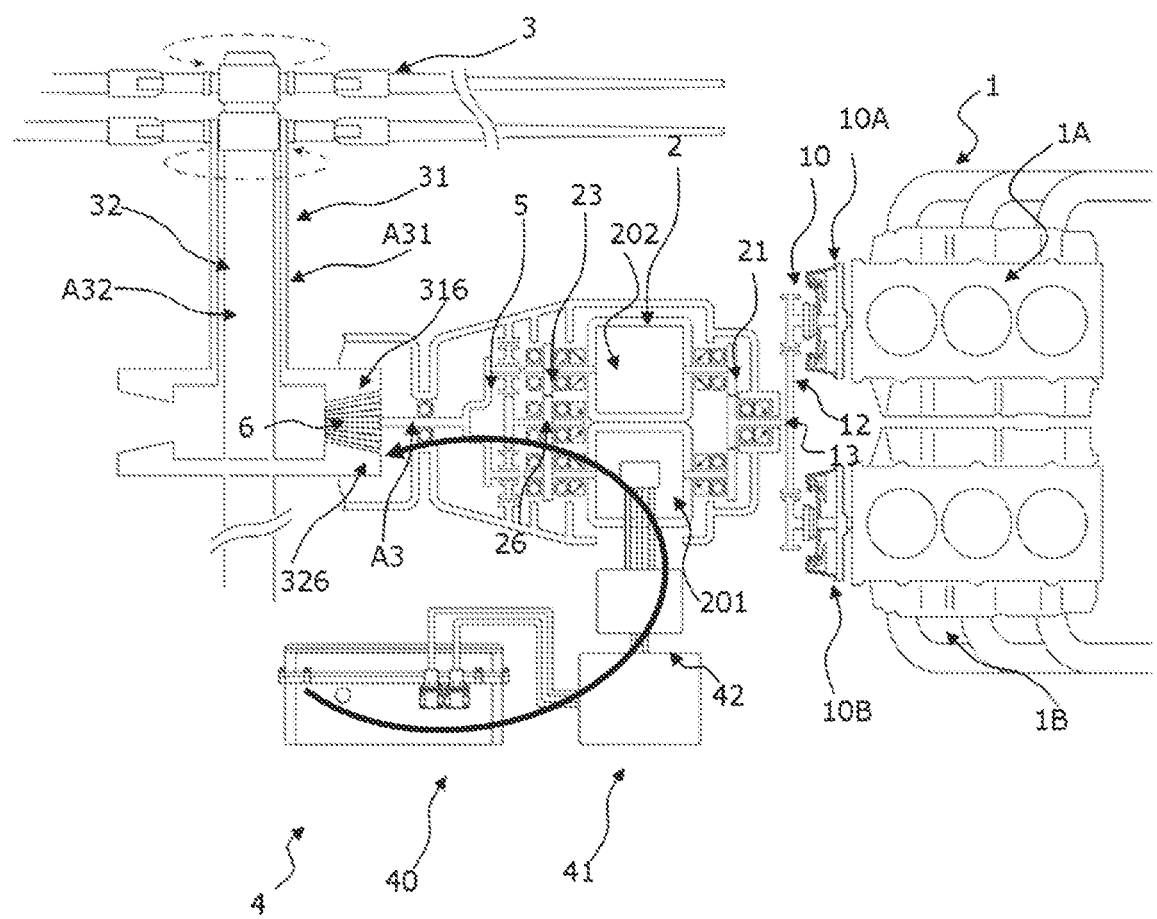

[Fig. 6]
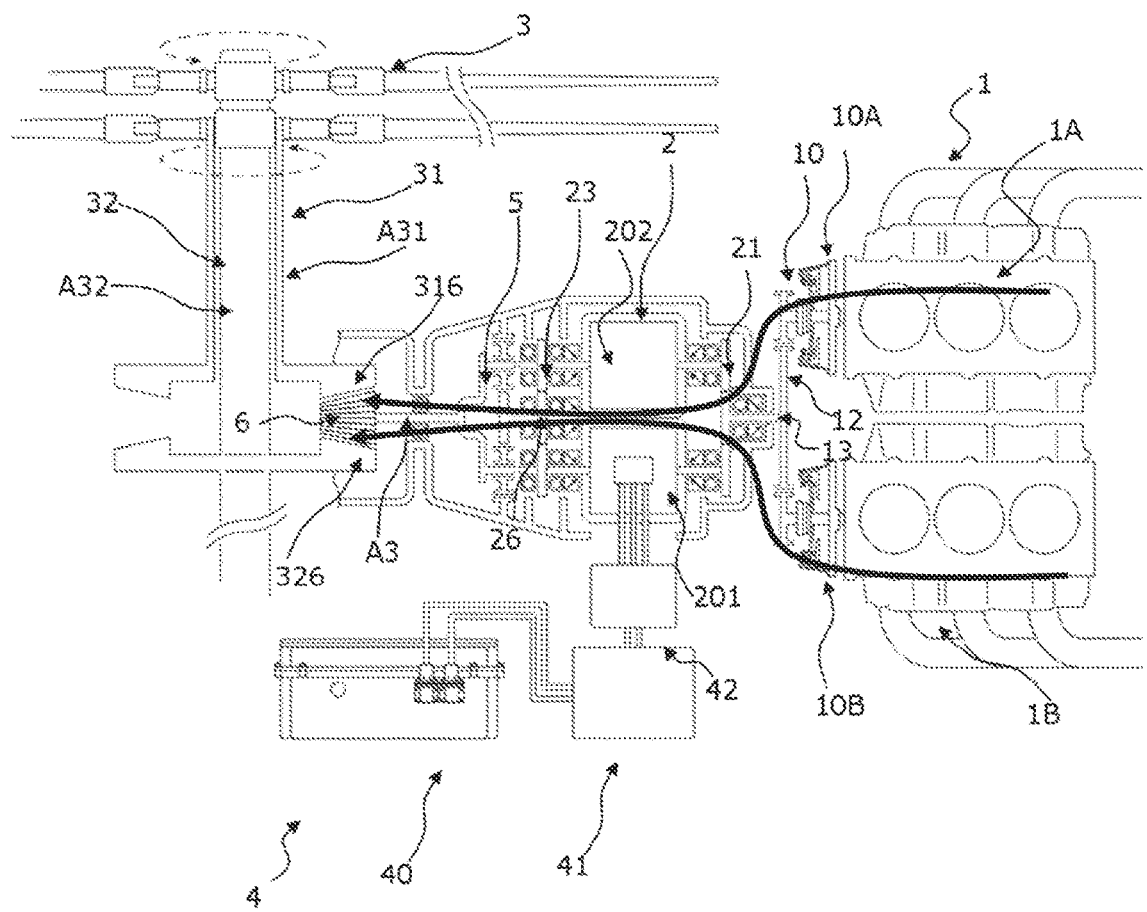

[Fig. 7]
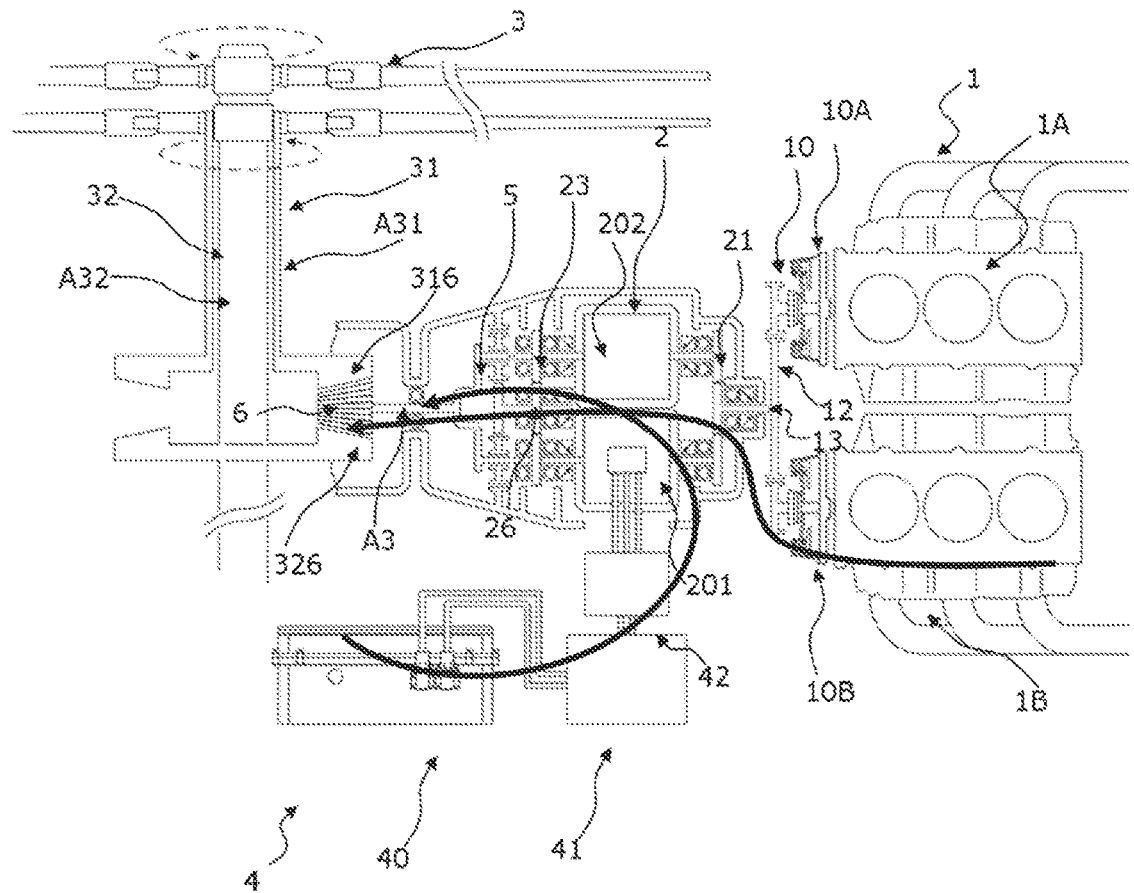

MACHINE COMPRISING A HYBRID POWERTRAIN AND CORRESPONDING CONTROL METHOD

FIELD OF THE INVENTION

The present invention relates in a general manner to a machine, such as an aircraft, equipped with a powertrain comprising a thermal drive system and an electric drive system.

PRIOR ART

The prior art discloses machines such as aircraft which comprise a powertrain with the following configuration. The powertrain comprises a bladed propulsion system, an electric drive system, a battery making it possible to supply the electric drive system with power, and a thermal engine associated with an alternator making it possible to recharge the battery.

However, in the case of a fault of the thermal drive system, the remaining electric power may prove to be insufficient to ensure secure control of the aircraft.

Document US2016083104 A1 describes an aircraft comprising a thermal drive system and an electric drive system arranged in parallel with the thermal drive system in order to supply additional power to drive a rotor of the aircraft in addition to the power provided by the thermal drive system.

The aim of the present invention is to propose a novel machine making it possible to overcome all or some of the problems explained above.

SUMMARY OF THE INVENTION

For this purpose, the subject of the invention is a machine, such as an aircraft, provided with a powertrain, characterized in that the powertrain comprises:
- a bladed propulsion system,
- a thermal drive system, comprising a first thermal engine and a second thermal engine, configured to make it possible to drive the bladed propulsion system,
- an electric drive system configured to make it possible to drive the bladed propulsion system,
- an electric power supply system comprising a battery making it possible to supply the electric drive system with power,
- a clutch system configured to make it possible to engage any one or each of the thermal engines to drive the bladed propulsion system, the clutch system also being configured to make it possible to disengage any one or each of the thermal engines with respect to the bladed propulsion system.

Such a hybrid powertrain configuration which comprises two thermal engines which are disengageable with respect to one another makes it possible to ensure secure control of the aircraft when one of the thermal engines is defective. Such a configuration is particularly useful when the machine is a helicopter.

The propeller propulsion system of the machine may thus be driven, independently or simultaneously, by the electric drive system and/or by the thermal drive system, a part or all of which may be used.

Safety, in particular during takeoff when the machine is an aircraft, is thus improved since, in the case of a problem in the electric transmission chain, the thermal drive system may take over in order to drive the propeller using one or the combination of the two thermal engines.

Moreover, the possibility of using an electric propulsion mode alone makes it possible for an aircraft to take off and to land on urban or peri-urban land with reduced noise production.

The fact of being able to disengage one of the thermal engines, while maintaining the other engaged, also makes it possible to overcome an engine fault or, for example in a cruise configuration, to reduce the energy consumption.

According to some embodiments, the machine makes it possible to obtain all or some of the following advantages:
- low noise during takeoff and landing,
- a high degree of safety in operation owing to the available drive system redundancies and the possibilities of adapting the drive system configuration,
- possible optimization of the energy consumption,
- a reduction in $CO_2$ emissions in takeoff and landing phases,
- a possibility of reducing the maintenance of such a powertrain with respect to the use of a turbine.

The machine may also comprise one or more of the following features taken in any technically feasible combination.

According to one advantageous feature of the invention, the electric drive system is arranged in series with the thermal drive system, between the thermal drive system and the bladed propulsion system.

According to one advantageous feature of the invention, said machine comprises a control unit for controlling the clutch system of the thermal drive system and the power supply system of the electric drive system, the control unit being configured to make it possible to engage the two thermal engines to transmit the rotational movement from the thermal drive system to the bladed propulsion system via the electric drive system, without consuming or recharging the electric battery.

According to one advantageous feature of the invention, said machine comprises a control unit for controlling the clutch system of the thermal drive system and the power supply system of the electric drive system, the control unit being configured to make it possible to disengage one of the two thermal engines, for example in the case of a fault of said thermal engine, the other thermal engine remaining engaged, and to control the electric power supply system in order to supply the electric drive system with power to drive the bladed propulsion system by means of one of the two thermal engines and the electric drive system.

According to one advantageous feature of the invention, the bladed propulsion system comprises two bladed rotors which each comprise a vertical rotary shaft provided with blades, said rotors being configured, in the rotationally driven state, to rotate in mutually opposite directions.

According to one advantageous feature of the invention, with the machine comprising an output shaft of the thermal drive system, the clutch system of the thermal drive system is interposed between the output shafts of the thermal engines and a movement transmission system configured to transmit the rotational movement from one or from each of said thermal engines to said output shaft of the thermal drive system.

According to one advantageous feature of the invention, the powertrain comprises a speed reduction system, preferably comprising a gear train, situated between the output shaft of the thermal drive system and the input of the electric drive system.

According to one advantageous feature of the invention, with the machine comprising an output shaft of the electric drive system, the powertrain comprises a transmission system arranged at the output of the electric drive system and configured to transmit the rotational movement from the electric drive system to said output shaft of the electric drive system.

According to one advantageous feature of the invention, with the machine comprising an output shaft of the electric drive system and an input shaft of the bladed propulsion system, the powertrain comprises a speed reduction system, preferably an epicyclic gear train, between said output shaft of the electric drive system and said input shaft of the bladed propulsion system.

According to one advantageous feature of the invention, the input shaft of the bladed propulsion system is provided with a bevel gear reduction device.

According to one advantageous feature of the invention, the electric drive system has a plurality of, preferably three, electric motors, which are preferably uniformly distributed about a central axis.

According to one advantageous feature of the invention, each electric motor comprises a declutching system, for example a dog-declutching system, making it possible, for example in the case of failure of said electric motor, to mechanically isolate said electric motor from the other electric motor(s).

According to one advantageous feature of the invention, the power of each thermal engine is of the order of 150 kW, and the power of the electric drive system is of the order of 180 kW, with preferably 60 kW per electric motor of the electric drive system.

According to one advantageous feature of the invention, the machine comprises a control unit for controlling the clutch system of the thermal drive system and the power supply system of the electric drive system, the control unit being configured to make it possible to engage the two thermal engines and to supply the electric drive system with power to drive the bladed propulsion system by means of the combination of the two thermal engines and the electric drive system.

According to one advantageous feature of the invention, the machine comprises a control unit for controlling the clutch system of the thermal drive system and the power supply system of the electric drive system, the control unit being configured to make it possible to engage the two thermal engines to drive the electric drive system, so as, on the one hand, to transmit, via the electric drive system, the rotational movement from the thermal drive system to the bladed propulsion system, while recharging the battery of the electric power supply system.

According to one advantageous feature of the invention, the machine comprises a control unit for controlling the clutch system of the thermal drive system and the power supply system of the electric drive system, the control unit being configured to make it possible to disengage the two thermal engines and to control the electric power supply system to supply the electric drive system with power in order to drive the bladed propulsion system by means of only the electric drive system.

According to one particular aspect, the various operating modes permitted by the control unit presented above are able to be selected with respect to one another.

According to one advantageous feature of the invention, the machine comprises a casing in which the electric drive system is housed and in which there are formed openings and/or cavities making it possible to cool the electric drive system, said powertrain preferably comprising a water cooling system for cooling the thermal engines.

The invention also relates to a method for controlling a machine as described above which comprises the disengagement or the engagement of one or each of the thermal engines with respect to the bladed propulsion system, and/or the control of the power supply system of the electric drive system to supply the electric drive system with power or to recharge the battery.

BRIEF DESCRIPTION OF THE DRAWINGS

Other features and advantages of the invention will become more clearly apparent from the following description, which is purely illustrative and nonlimiting and should be read with reference to the appended drawings, in which:

FIG. 1 is a schematic view of an aircraft, in this case a helicopter, according to one embodiment of the invention;

FIG. 2 is a schematic view of a powertrain of an aircraft, such as that of FIG. 1, according to one embodiment of the invention;

FIG. 3 is a schematic view of a powertrain according to one embodiment of the invention, for example in takeoff and/or climb mode, combining thermal propulsion and electric propulsion;

FIG. 4 is a schematic view of a powertrain of an aircraft according to one embodiment of the invention, in thermal propulsion and electric battery recharge mode;

FIG. 5 is a schematic view of a powertrain of an aircraft according to one embodiment of the invention, in electric propulsion mode alone;

FIG. 6 is a schematic view of a powertrain of an aircraft according to one embodiment of the invention, in thermal propulsion mode alone;

FIG. 7 is a schematic view of an aircraft according to one embodiment of the invention, during its flight, for example in level flight and/or for example in the case of a fault of one of the thermal engines.

DETAILED DESCRIPTION

The concept of the invention is described more completely below with reference to the appended drawings, in which embodiments of the concept of the invention are shown. In the drawings, the size and the relative sizes of the elements may be exaggerated for reasons of clarity. Similar numbers make reference to similar elements throughout the drawings. However, this concept of the invention may be implemented in numerous different forms and should not be interpreted as being limited to the embodiments explained here. Instead, these embodiments are proposed such that this description is complete, and communicate the extent of the concept of the invention to those skilled in the art. The embodiments which follow are examined, for the sake of simplification, in connection with the terminology and the structure of an aircraft. As explained below, the machine may also be a nautical machine.

A reference throughout the specification to "a/one embodiment" means that a functionality, a structure or a particular feature described in connection with a/one embodiment is included in at least one embodiment of the present invention. Thus, the occurrence of the expression "in a/one embodiment" at various points throughout the specification does not necessarily make reference to the same embodiment. In addition, the functionalities, the structures or the particular features may be combined in any suitable manner in one or more embodiments.

In FIG. 1 there is illustrated a machine which is a helicopter 100 provided with a powertrain.

In a variant, the machine may be an aircraft of another type, such as an airplane or a drone. The machine may also be a nautical machine.

The powertrain of the helicopter comprises a bladed propulsion system 3 which includes two counter-rotating rotors 31, 32. In a variant, a single rotor may be provided.

The helicopter may also comprise an anti-torque rotor or some other anti-torque device which may be driven by said powertrain or by an independent drive system. The anti-torque device is not necessary when the machine comprises two counter-rotating rotors.

The description which follows is given for a helicopter but applies to other types of machines provided with a bladed propulsion system. It will be understood in particular that, depending on the type of machine, the bladed propulsion system of the aircraft may comprise one or more propellers for an airplane or a boat.

Furthermore, the description is also applicable to machines such as those described in French patent application filed under the number FR 18 01092, not yet published at the filing date of the present application, replacing the thermal engine described in this application FR 18 01092 by an assembly of two thermal engines which can be disengaged with respect to one another as explained below.

As illustrated in FIG. 2, the powertrain comprises a thermal drive system 1 configured to make it possible to drive the bladed propulsion system 3 as detailed below.

Thermal Drive System

The thermal drive system 1 includes a first thermal engine 1A and a second thermal engine 1B. Each of the first and second thermal engines comprises an output shaft.

The power of each thermal engine 1A, 1B is, for example, 150 kW.

Said powertrain preferably comprises a water cooling system for cooling the thermal engines 1A, 1B.

Clutch System

The powertrain comprises a clutch system 10 which makes it possible to engage any one or each of the thermal engines 1A, 1B to drive the bladed propulsion system 3.

The clutch system 10 comprises a clutch 10A and a clutch 10B which can be controlled selectively to make it possible to engage the first thermal engine 1A and/or to engage the second thermal engine 1B with respect to the movement transmission chain for transmitting movement between the thermal drive system 1 and the bladed propulsion system 3.

The clutch system 10 is also configured to make it possible to disengage any one or each of the thermal engines 1A, 1B with respect to the bladed propulsion system 3.

What is to be understood by "disengage with respect to the bladed propulsion system 3" is the fact that the thermal drive system 1 is decoupled from the force or movement transmission chain which extends between the thermal drive system 1 and the bladed propulsion system 3.

The clutch system 10 of the thermal drive system 1 is interposed between the output shafts of the thermal engines 1A, 1B and a movement transmission system 12.

The movement transmission system 12 is configured to transmit the rotational movement from one or from each of said thermal engines to a shaft 13, termed output shaft, of the thermal drive system 1.

The system 12 comprises, for example, a set of gears, or else a wheel and belt set or a chain set.

The output shaft 13 is coupled or couplable to the bladed propulsion system 3 via a movement transmission mechanism presented below.

Transmission Mechanism

The transmission mechanism comprises a speed reduction system which comprises a gear train 21 situated between the output shaft 13 of the thermal drive system 1 and the input of the electric drive system 2.

The gear train comprises an input shaft 13 and planet gears borne by the input shafts of the electric drive system 2.

The transmission mechanism also comprises a transmission system 23 arranged at the output of the electric drive system 2 and configured to transmit the rotational movement from the electric drive system 2 (which comprises a plurality of electric motors in the example illustrated in the figures) to a shaft, termed output shaft 26, of the electric drive system.

The output shaft 26 is preferably coaxial with the output shaft 13.

The transmission system 23 forms a reduction unit (for example of a ratio equal to approximately 1.4) which, with the output shaft 26, makes it possible to act on a speed reduction system 5.

The speed reduction system 5 comprises an epicyclic gear train 5 whose reduction ratio is, for example, equal to approximately 3.

The epicyclic gear train 5 is situated between the output shaft 26 of the electric drive system 2 and an input shaft A3 of the bladed propulsion system 3.

Electric Drive System

The powertrain also comprises an electric drive system 2 configured to make it possible to drive the bladed propulsion system 3.

An electric power supply system 4 comprises a battery 40 making it possible to supply the electric drive system 2 with power. Of course, the battery 40 may comprise a set of batteries.

The electric power supply system 4 also comprises an electric management system 41, 42 which comprises a high-voltage housing 41 and a controller 42.

The high-voltage housing 41 makes it possible to open or to close the power supply circuit between the battery 40 and the electric drive system 2. The controller 42 makes it possible to process the current provided by the battery 40 or produced by the electric drive system 2 when it operates as a generator.

In the example illustrated in the figures, the electric drive system 2 has a plurality of electric motors 201, 202, which are preferably uniformly distributed about a central axis. Advantageously, the electric drive system comprises three motors distributed at 120° about an imaginary axis coaxial to the output axis 26. Thus, in the example illustrated in the figures, only two motors are shown, but a third is present.

The power of the electric drive system 2 is 180 kW, with preferably 60 kW per electric motor 2.

Each electric motor 201, 202 has an input shaft coupled to the reduction system 21 and an output shaft coupled to the output transmission system 23.

Each electric motor 201, 202 comprises a declutching system making it possible, for example in the case of failure of said electric motor, to mechanically isolate said electric motor from the other electric motor(s). The declutching system may be a dog-declutching system.

In a general manner, when reference is made to a clutch system, this may be of the friction or dog type.

The powertrain comprises a casing in which the electric drive system 2 is housed. Openings and/or cavities may be formed in the casing to make it possible to cool the electric drive system 2.

Propulsion System

According to the embodiment illustrated in the figures, the bladed propulsion system 3 comprises two bladed rotors 31, 32 which each comprise a vertical rotary shaft A31, A32 provided with blades. Said rotors 31, 32 are configured, in the rotationally driven state, to rotate in mutually opposite directions.

The input shaft A3 of the bladed propulsion system 3 is provided with a bevel gear reduction device 6. The bevel gear reduction device 6 comprises a bevel gear with a reduction ratio which is, for example, of the order of 3.7.

In the example illustrated in the figures, each rotor 31, 32 shaft A31, A32 is provided with a conical bearing surface 316, 326 configured to cooperate with the bevel gear 6 borne by the input shaft A3 of the bladed propulsion system 3.

According to one particular aspect, the powertrain comprises a control unit making it possible to control the clutch system 10 of the thermal drive system 1 and the power supply system 4 of the electric drive system 2.

Examples of Control Methods

In the example illustrated in the figures, the clutches are shown by simplification in the open position. However, the description below specifies the actual, open (disengaged) or closed (engaged), configuration of each of said clutches according to the control method implemented. Moreover, arrows have been added (separate from the reference arrows) to symbolize the movement transmission chain which is active and, where appropriate, the electric current delivered or received by the electric power supply system.

The powertrain presented above makes it possible to implement various control methods of the aircraft by adapting the configuration of the clutches.

The control unit is configured to make it possible to select various operating configurations of the powertrain according to the operations to be carried out.

According to a first operating configuration illustrated in FIG. 3, the control unit controls the engagement of the two thermal engines 1A, 1B and the power supply of the electric drive system 2 to drive the bladed propulsion system 3 by means of the combination of the two thermal engines 1A, 1B and the electric drive system 2. This operating mode illustrated in FIG. 3 is particularly useful in the case of a high power requirement, in particular during takeoff.

The powertrain thus makes it possible to combine the rotational movement provided by the two thermal engines and the rotational movement provided by the electric motor to drive the bladed propulsion system.

According to a second operating configuration illustrated in FIG. 4, the control unit controls the engagement of the two thermal engines 1A, 1B to drive the electric drive system 2 so as, on the one hand, to transmit, via the electric drive system 2, the rotational movement from the thermal drive system 1 to the bladed propulsion system 3, while controlling the power supply system 4 to recharge the battery 40.

This operating mode illustrated in FIG. 4 may be used when the power requirement for the propulsion system 3 is below that which can be provided by the thermal drive system 1 and when the electric battery 40 needs to be recharged.

Such an operating mode of the powertrain makes it possible to use the surplus power of the thermal engine 1 to recharge the battery 40 in flight, in particular when the battery has been used for the electric propulsion during the takeoff phase.

According to one particular aspect, the drive system 2, in particular the electric motors which make it up in the example illustrated in the figures, has or have a double output at their rotor, this allowing them to be a motor and/or generator according to the operating case.

Thus, in cruise mode, the power provided by the thermal engines 1A, 1B is the main propulsion source. The electric motors are converted into generators and recharge the battery pack 40 via the converter 42 and the power electronics 41.

Advantageously, the power provided is approximately 260 kW for the propulsion by the thermal drive system and 30 kW for recharging the battery.

According to a third operating configuration illustrated in FIG. 5, the control unit controls the disengagement of the two thermal engines 1A, 1B and controls the power supply system 4 to supply the electric drive system 2 with power. Thus, the bladed propulsion system 3 is driven by means of only the electric drive system 2. This operating mode illustrated in FIG. 5 is particularly useful for a silent landing.

It is thus possible in landing mode to activate only the electric mode by means of the battery 40 and the electric management system 41, 42 which provide the electric energy to the electric drive system 2.

According to a fourth operating configuration illustrated in FIG. 6, the control unit controls the engagement of the two thermal engines 1A, 1B to transmit the rotational movement from the thermal drive system 1 to the bladed propulsion system 3, but without consuming or generating electric current.

The rotational movement of the thermal drive system 1 is transmitted to the bladed propulsion system 3 via the electric drive system 2, which is then passive. In other words, the electric drive system 2 serves simply as a mechanical link in the movement transmission chain between the thermal drive system 1 and the propulsion system 3. This operating mode illustrated in FIG. 6 is particularly useful in the case of failure of the electric power supply system.

According to a fifth operating configuration illustrated in FIG. 7, the control unit controls the disengagement of one 1A of the two thermal engines 1A, 1B, for example in the case of a fault of said thermal engine 1A, the other thermal engine 1B remaining engaged. Advantageously, the control unit also controls the power supply system 4 to supply the electric drive system 2 with power. Thus, the bladed propulsion system 3 is driven by means of one of the two thermal engines 1A, 1B and preferably the electric drive system 2.

This operating mode illustrated in FIG. 7 is a particularly useful operating mode in the case of failure of a thermal engine.

In the case of failure of one of the thermal engines, it is thus possible to disengage the failed thermal engine and to maintain the power of the remaining thermal engine, for example 150 kW, in order to continue to cause the propulsion system 3 to function. This power of the remaining thermal engine can be added to the power of the electric motor to drive the propulsion system 3, thereby making it possible to carry out a safe landing of the aircraft.

This operating mode may also be used, for example in a cruise flight configuration, to reduce the energy consumption.

In a general manner, each thermal engine 1 can be shut down or may rotate at idle while awaiting to be used.

Particular Aspects

There may be provision that the clutch system is controlled to switch from one configuration to another by a manual or automatic control device comprising the control unit. The control device may comprise a man-machine interface connected to the control unit to allow the pilots to switch from one configuration to another of the powertrain. There may also be provision that the switch from one configuration to another of the powertrain is triggered automatically by the control unit when predefined conditions are met.

In particular, there may be provision that the control unit, such as a computer, makes it possible to control a system for actuating the clutches to switch from one configuration to another. The control unit may take the form of a processor or of a data memory in which there are stored computer instructions which can be executed by said processor, or else take the form of a microcontroller.

In other words, the functions and steps described may be implemented by means of a computer program or via hardware components (for example programmable gate arrays). In particular, the functions and steps carried out by the control unit presented above may be performed by sets of instructions or computer modules implemented in a processor or controller or be performed by dedicated electronic components or FPGA or ASIC components. It is also possible to combine computer parts and electronic parts.

The invention is not limited to the embodiments illustrated in the drawings.

Furthermore, the term "comprising" does not exclude other elements or steps. In addition, features or steps which have been described with reference to one of the embodiments explained above may also be used in combination with other features or steps of other embodiments explained above.

The invention claimed is:

1. A machine provided with a powertrain, wherein the powertrain comprises:
    a bladed propulsion system,
    a thermal drive system, comprising a first thermal engine and a second thermal engine, configured to drive the bladed propulsion system,
    an electric drive system configured to drive the bladed propulsion system,
    an electric power supply system comprising a battery configured to supply the electric drive system with power,
    a clutch system configured to engage any one or each of the thermal engines to drive the bladed propulsion system, the clutch system also being configured to disengage any one or each of the thermal engines with respect to the bladed propulsion systems;
    wherein the electric drive system is arranged in series with the thermal drive system, between the thermal drive system and the bladed propulsion system,
    wherein an output shaft of the thermal drive system is interposed between the thermal drive system and the electric drive system, and
    wherein the clutch system is interposed between output shafts of the first thermal engine and the second thermal engine and a movement transmission system configured to transmit a rotational movement from one or from each of the first thermal engine and the second thermal engine to the output shaft of the thermal drive system.

2. The machine as claimed in claim 1, wherein the machine comprises a control unit for controlling the clutch system and the electric power supply system of the electric drive system, the control unit being configured to engage the first thermal engine and the second thermal engine to transmit the rotational movement from the thermal drive system to the bladed propulsion system via the electric drive system, without consuming or recharging the battery.

3. The machine as claimed in claim 1, wherein the machine comprises a control unit for controlling the clutch system and the electric power supply system of the electric drive system, the control unit being configured to disengage one of the first thermal engine and the second thermal engine, the other of the first thermal engine and the second thermal engine remaining engaged, and to control the electric power supply system in order to supply the electric drive system with power to drive the bladed propulsion system using the other of the first thermal engine and the second thermal engine and the electric drive system.

4. The machine as claimed in claim 1, wherein the bladed propulsion system comprises two bladed rotors, each of the two bladed rotors comprising a vertical rotary shaft provided with blades, the two bladed rotors being configured, in a rotationally driven state, to rotate in mutually opposite directions.

5. The machine as claimed in claim 1, wherein the powertrain comprises a speed reduction system situated between the output shaft of the thermal drive system and an input of the electric drive system.

6. The machine as claimed in claim 1, wherein the machine comprises an output shaft of the electric drive system, and wherein the powertrain comprises a transmission system arranged at an output of the electric drive system and configured to transmit a rotational movement from the electric drive system to the output shaft of the electric drive system.

7. The machine as claimed in claim 1, wherein the machine comprises an output shaft of the electric drive system and an input shaft of the bladed propulsion system, and wherein the powertrain comprises a speed reduction system between the output shaft of the electric drive system and the input shaft of the bladed propulsion system.

8. The machine as claimed in claim 7, wherein the input shaft of the bladed propulsion system is provided with a bevel gear reduction device.

9. The machine as claimed in claim 7, wherein the speed reduction system is an epicyclic gear train.

10. The machine as claimed in claim 1, wherein the electric drive system has a plurality of electric motors.

11. The machine as claimed in claim 10, wherein each electric motor of the plurality of electric motors comprises a declutching system configured to mechanically isolate one of the electric motors from the other electric motor or motors.

12. The machine as claimed in claim 10, wherein the electric motors are distributed uniformly about a central axis.

13. The machine as claimed in claim 1, wherein a power of each the of the first thermal engine and the second thermal engine is about 150 kW, and a power of the electric drive system is about 180 kW.

14. The machine as claimed in claim 1, wherein the machine comprises a control unit for controlling the clutch system and the electric power supply system of the electric drive system, the control unit being configured to engage the first thermal engine and the second thermal engine and to supply the electric drive system with power to drive the bladed propulsion system using a combination of the first thermal engine and the second thermal engine and the electric drive system.

15. The machine as claimed in claim 1, wherein the machine comprises a control unit for controlling the clutch system and the electric power supply system of the electric drive system, the control unit being configured to engage the first thermal engine and the second thermal engine to drive the electric drive system, so as to transmit, via the electric drive system, a rotational movement from the thermal drive system to the bladed propulsion system, while recharging the battery of the electric power supply system.

16. The machine as claimed in claim 1, wherein the machine comprises a control unit for controlling the clutch system and the electric power supply system of the electric drive system, the control unit being configured to disengage the first thermal engine and the second thermal engine and to control the electric power supply system to supply the electric drive system with power in order to drive the bladed propulsion system using only the electric drive system.

17. The machine as claimed in claim 1, wherein the machine comprises a casing in which the electric drive system is housed and in which there are formed openings, cavities, or openings and cavities configured to cool the electric drive system.

18. A method for controlling the machine as claimed in claim 1, wherein the method comprises at least one of the following:
    engaging or disengaging one or each of the first thermal engine and the second thermal engine with respect to the bladed propulsion system,
    controlling the electric power supply system of the electric drive system to supply the electric drive system with power or to recharge the battery.

19. The machine as claimed in claim 1, wherein the machine comprises a control unit for controlling the clutch system and the electric power supply system of the electric drive system, wherein the electric drive system has a plurality of electric motors, wherein each electric motor of the plurality of electric motors comprises a declutching system configured to mechanically isolate one of the electric motors from the other electric motor or motors,
    wherein the control unit is configured to engage and/or disengage each of the first thermal engine and the second thermal engine individually and to engage and/or disengage each of the plurality of electric motors.

20. The machine as claimed in claim 1, wherein the machine comprises a control unit for controlling the clutch system and the electric power supply system of the electric drive system, the control unit being configured to cause the machine to operate in a plurality of alternate operation modes, as follows:
    engage the first thermal engine and the second thermal engine to transmit the rotational movement from the thermal drive system to the bladed propulsion system via the electric drive system, without consuming or recharging the electric battery,
    disengage one of the first thermal engine and the second thermal engine, the other thermal engine remaining engaged, and control the electric power supply system in order to supply the electric drive system with power to drive the bladed propulsion system using one of the first thermal engine and the second thermal engine and the electric drive system,
    engage the first thermal engine and the second thermal engine and supply the electric drive system with power to drive the bladed propulsion system using a combination of the first thermal engine and the second thermal engine and the electric drive system,
    engage the first thermal engine and the second thermal engine to drive the electric drive system, so as to transmit, via the electric drive system, a rotational movement from the thermal drive system to the bladed propulsion system, while recharging the battery of the electric power supply system,
    disengage the first thermal engine and the second thermal engine and control the electric power supply system to supply the electric drive system with power in order to drive the bladed propulsion system using only the electric drive system.

* * * * *